(12) United States Patent
Kinlen

(10) Patent No.: US 9,728,346 B2
(45) Date of Patent: Aug. 8, 2017

(54) REDOX POLYMER ENERGY STORAGE SYSTEM

(71) Applicant: The Boeing Company, Chicago, IL (US)

(72) Inventor: Patrick John Kinlen, Fenton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/041,762

(22) Filed: Feb. 11, 2016

(65) Prior Publication Data

US 2016/0163471 A1    Jun. 9, 2016

Related U.S. Application Data

(62) Division of application No. 13/426,692, filed on Mar. 22, 2012, now Pat. No. 9,325,041.

(51) Int. Cl.
| | |
|---|---|
| *H01G 9/00* | (2006.01) |
| *H01L 21/00* | (2006.01) |
| *H01L 21/64* | (2006.01) |
| *H01B 5/00* | (2006.01) |
| *H01G 13/00* | (2013.01) |

(Continued)

(52) U.S. Cl.
CPC ............. *H01G 13/00* (2013.01); *H01G 11/02* (2013.01); *H01G 11/36* (2013.01); *H01G 11/48* (2013.01); *H01G 11/52* (2013.01); *H01G 11/56* (2013.01); *H01M 4/602* (2013.01); *H01M 4/608* (2013.01);
(Continued)

(58) Field of Classification Search
CPC ........ H01G 9/155; H01G 9/058; H01G 13/00; Y02E 60/13

USPC .......... 29/25.02, 25.03; 174/126.2; 361/502; 977/742

See application file for complete search history.

(56) References Cited

U.S. PATENT DOCUMENTS

| | | |
|---|---|---|
| 4,031,436 A | 6/1977 | Alwitt |
| 4,107,059 A | 8/1978 | King et al. |

(Continued)

FOREIGN PATENT DOCUMENTS

| | | |
|---|---|---|
| CN | 1230283 A | 9/1999 |
| EP | 1484809 A1 | 12/2004 |

(Continued)

OTHER PUBLICATIONS

EP Search Report for related application No. 13159818.7-1360 dated Jun. 19, 2013.

(Continued)

*Primary Examiner* — Eric Thomas
*Assistant Examiner* — Arun Ramaswamy
(74) *Attorney, Agent, or Firm* — Armstrong Teasdale LLP

(57) ABSTRACT

An energy storage system includes, in an exemplary embodiment, a first current collector having a first surface and a second surface, a first electrode including a plurality of carbon nanotubes on the second surface of the first current collector. The plurality of carbon nanotubes include a polydisulfide applied onto a surface of the plurality of nanotubes. The energy storage system also includes an ionically conductive separator having a first surface and a second surface, with first surface of the ionically conductive separator positioned on the first electrode, a second current collector having a first surface and a second surface, and a second electrode including a plurality of carbon nanotubes positioned between the first surface of the second current collector and the second surface of the ionically conductive separator.

8 Claims, 7 Drawing Sheets

(51) Int. Cl.
| | |
|---|---|
| H01G 11/02 | (2013.01) |
| H01G 11/36 | (2013.01) |
| H01G 11/48 | (2013.01) |
| H01G 11/56 | (2013.01) |
| H01M 4/60 | (2006.01) |
| H01M 14/00 | (2006.01) |
| H01G 11/52 | (2013.01) |

(52) U.S. Cl.
CPC ............ *H01M 14/00* (2013.01); *Y02E 60/13* (2013.01); *Y10T 29/417* (2015.01)

(56) References Cited

U.S. PATENT DOCUMENTS

| | | |
|---|---|---|
| 4,407,825 A | 10/1983 | Hiestand et al. |
| 5,247,061 A | 9/1993 | Zisman et al. |
| 6,703,163 B2 | 3/2004 | Ogura et al. |
| 2003/0030963 A1 | 2/2003 | Tennent et al. |
| 2004/0157122 A1 | 8/2004 | Naoi et al. |
| 2012/0182666 A1 | 7/2012 | Kinlen et al. |

FOREIGN PATENT DOCUMENTS

| | | |
|---|---|---|
| EP | 1978053 A1 | 10/2008 |
| JP | 2007234338 A | 9/2007 |
| WO | 2007037254 A1 | 4/2007 |

OTHER PUBLICATIONS

Picart, Sebastien et al.; Electrochemical Study of 2,5-dimercapto-1,3,4-thiadiazole in Acetonitrile; Journal of Electroanalytical Chemistry; 1996; vol. 408; pp. 53.60.

Jin, Lifeng et al.; Poly (2,5-dimercapto-1,3,4-thiadiazole)/Sulfonated Graphene Composite as Cathode Material for Rechargeable Lithium Batteries; Journal of Applied Electrochemistry; 2011; vol. 41; pp. 377-382.

Stoller, Meryl D. et al.; Graphene-Based Ultracapacitors; Nano Letters; 2008; vol. 8, No. 10; pp. 3498-3502.

Kiya, Yasuyuki et al.; A Modifiable Organosulfur Compound as a High-Energy Cathode for Lithium-Ion Rechargeable Batteries; Journal of the Electrochemical Society; 2007; vol. 154, No. 9; pp. A844-A848.

Matsumoto, Futoshi et al.; Studies on the Adsorption Behavior of 2,4-Dimercapto-1,3,4-thiadiazole and 2-Mercapto-5-methyl-1,3,4-thiadiazole at Gold and Copper Electrode Surfaces; Langmuir; 1999; vol. 15; pp. 857-865.

Doeff, M.M. et al.; The Use of Polydisulfides and Copolymeric Disulfides in the Li/PEO/SRPE Battery System; Journal of the Electrochemical Society; Aug. 1992; vol. 139, No. 8; pp. 2077-2081.

Huang, Xiao-Ying et al.; Diastereoisomeric Macrocyclic Polydisulfides from the Mangrove *Bruguiera gymnorrhiza*; Phytochemistry; Elsevier; 2009; 5 pp.

Bismarck, A. et al.; Structural Power Composites as Energy Storage Devices; 18th International Conference on Composite Materials; Aug. 21-26, 2011; Jeju Island, Korea; 6 pp.

China First Office Action for related application 201310091287.9 dated Oct. 8, 2016, 25 pp.

Cuentas Gallegos, Ana Karina et al., "Dispersion of SiW12 Nanoparticles on Highly Oxidized Multiwalled Carbon Nanotubes and their Electrocatalytic Behavior", available at https://www.researchgate.net/publication/231523601_Dispersion_of_SiW12_Nanoparticles_on_Highly_Oxidized_Multiwalled_Carbon_Nanotubes_and_their_Electrocatalytic_Behavior, last visited Feb. 10, 2017; 10 pp.

JP Office Action for related application 2013-058000 dated Mar. 7, 2017; 6 pp.

US 9,728,346 B2

REDOX POLYMER ENERGY STORAGE SYSTEM

CROSS-REFERENCE TO RELATED APPLICATIONS

This application is a divisional and claims priority to U.S. patent application Ser. No. 13/426,692 filed Mar. 22, 2012 for "REDOX POLYMER ENERGY STORAGE SYSTEM", which is hereby incorporated by reference in its entirety.

BACKGROUND OF THE INVENTION

The field of the invention relates generally to a redox polymer energy storage system, and more particularly to the use of electroactive polymers applied to carbon structures.

Capacitors having a double layer capacitance may be used as energy storage devices that store and release energy. Known double layer capacitors store an amount of energy that is inversely proportional to the thickness of the double layer. At low voltages, these double layer capacitors typically have a higher energy density than conventional dielectric capacitors.

Lithium ion batteries are also used as energy storage devices. Such batteries typically have very high energy density. Drawbacks of lithium ion batteries are that these batteries need to be hermetically sealed and requires a water free electrolyte composition. In addition, when the lithium ion batteries are spent, the lithium in the battery needs to be sequestered rather than be placed in a waste dump.

It would be desirable to provide an energy storage system that is a solid state device, has high energy density, is not susceptible to leaking, and is stable at high G-forces and temperature extremes.

BRIEF DESCRIPTION OF THE INVENTION

In one aspect, an energy storage system is provided. The energy storage system includes a first current collector having a first surface and a second surface, a first electrode including a plurality of carbon nanotubes on the second surface of the first current collector. The plurality of carbon nanotubes include a polydisulfide applied onto a surface of the plurality of nanotubes. The energy storage system also includes an ionically conductive separator having a first surface and a second surface, with first surface of the ionically conductive separator positioned on the first electrode, a second current collector having a first surface and a second surface, and a second electrode including a plurality of carbon nanotubes positioned between the first surface of the second current collector and the second surface of the ionically conductive separator.

In another aspect, an energy storage system is provided. The energy storage system includes a first current collector and a second current collector having a plurality of carbon nanotubes bonded to a surface of the first current collector and the second current collector, a polydisulfide deposited onto the carbon nanotubes of at least one current collector, and an ionically conductive separator sandwiched between the carbon nanotubes of the first current collector and the nanotubes of the second current collector. The separator being configured to transport protons from the carbon nanotubes of the first current collector to the carbon nanotubes of the second current collector.

In another aspect, a method of making an energy storage system is provided. The method includes applying a plurality of carbon nanotubes to a surface of a first current collector, applying a plurality of carbon nanotubes to a surface of a second current collector, and coating the carbon nanotubes of at least one of the first current collector and the second current collector with a polydisulfide. The method also includes positioning an ionically conductive separator between the carbon nanotubes applied to the first current collector and the nanotubes applied to the second current collector to form the energy storage system having a sandwich configuration.

DETAILED DESCRIPTION OF THE INVENTION

A redox polymer energy storage system and method of making the energy storage system is described in detail below. The energy storage system uses electro-active redox polymers for energy storage, for example, in one embodiment, polydisulfides that are coated and/or otherwise applied to carbon nanotube (CNT) structures. In another embodiment, a disulfide monomer is applied to the CNT structures and may be electro-polymerized to form a polydisulfide. The resulting CNT-polydisulfide structure serves as a redox electrode for the energy storage system. The polymerization reaction of the disulfide monomer is reversible and permits the energy storage system to withstand multiple charge and discharge cycles. The energy storage system includes two current collectors with a first electrode formed from carbon nanotubes, a second electrode of carbon nanotubes, and a transport separator, positioned between the two current collectors. The transport separator is positioned between the first and second electrodes to insulate the electrodes from electrical contact. The energy storage system is a solid state device that does not utilize liquids and thus is not susceptible to leaking and is stable at high G-forces and temperature extremes. In addition, the energy storage device mechanism makes and breaks disulfide bonds, and thus only protons transport during the charge and discharge cycles. Because the transport separator only needs to facilitate proton transport, the transport separator facilitates high power density in the energy storage system.

Figure 1:
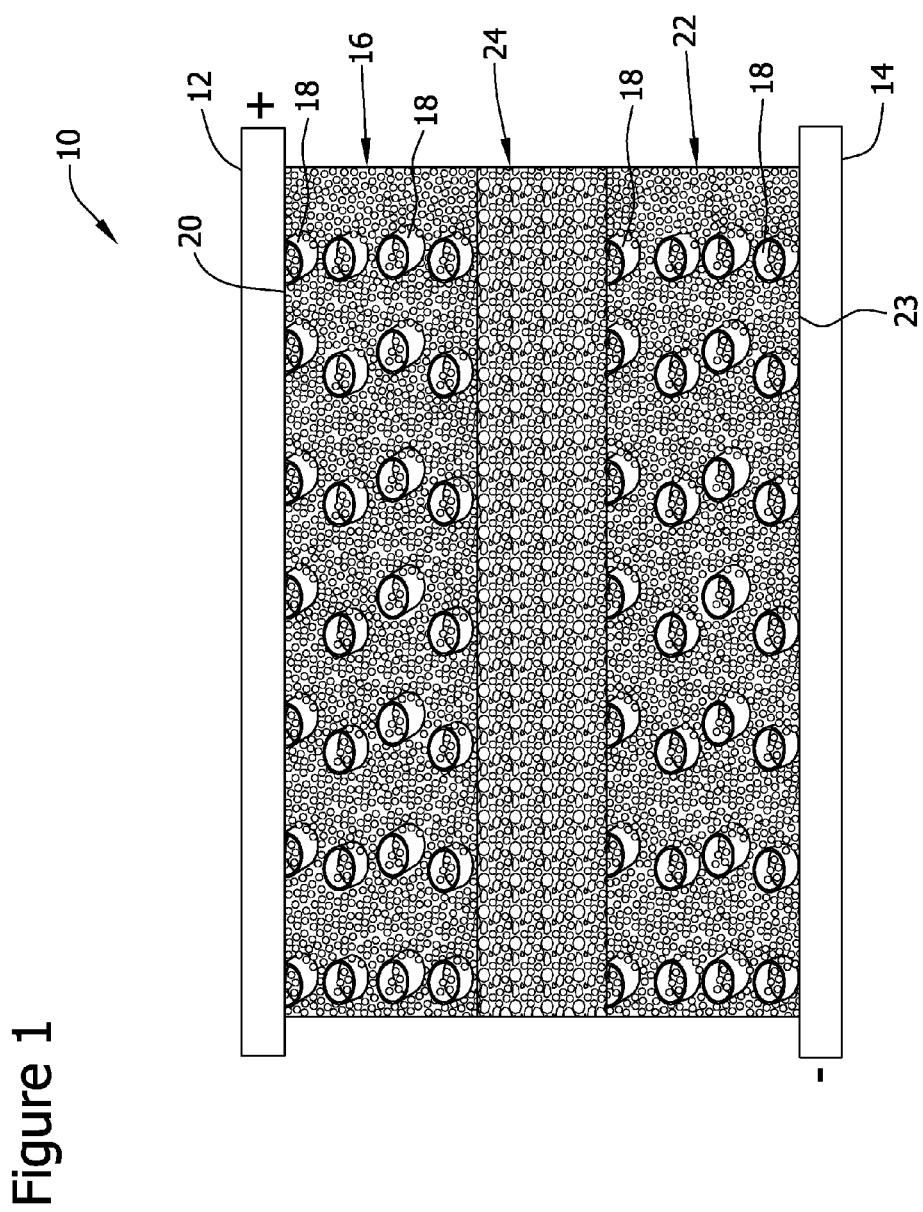
FIG. 1 is a schematic illustration of an embodiment of a redox polymer energy storage system.

Referring to the drawings, FIG. 1 is a schematic illustration, in an exemplary embodiment, of a redox polymer energy storage system 10. Energy storage system 10 has a sandwich configuration of a plurality of layers. The layers include a first current collector 12 and a second current collector 14. A first electrode 16 formed from carbon nanotubes 18 (CNT) applied to an inner surface 20 of first current collector 12, and a second electrode 22 formed from carbon nanotubes 18 applied to an inner surface 23 of second current collector 14. An ionically conductive separator 24 is positioned between first electrode 16 and second electrode 22.

Carbon nanotubes 18 have an inherently large surface area and thus a large capacitance (C) because C is proportional to the surface area A of carbon nanotubes 18. (C=∈∈° A/d where ∈ is the dielectric permittivity of the electrolyte double layer, ∈° the dielectric permittivity of free space and d is the double layer thickness). To enhance the energy storage capability of carbon nanotube electrodes 16 and 22, a polydisulfide is deposited onto the surface of the carbon nanotubes. The polydisulfide enhances the energy storage capability of the electrode by adding a redox capacitance to the existing carbon nanotube capacitance. The magnitude of the redox capacitance is proportional to the molecular density of the disulfide molecule on the carbon nanotube surface.

An electroactive redox polymer, for example, polydisulfide, is applied to carbon nanotubes 18. In another embodiment, a disulfide monomer is applied to carbon nanotubes 18, and the disulfide monomer is electro-polymerized to form a polydisulfide on carbon nanotubes 18. In the exemplary embodiment, the polydisulfide may be a poly(2,5-dimercapto-1,3,4-thiadiazole) (polyDMcT). Other suitable disulfide polymers may include, but not limited to, bis-2,5-dithio-1,3,4-thiadiazole, poly(Zn-2,5-dimercapto-1,3,4-thiadiazole), poly(Cu-2,5-dimercapto-1,3,4-thiadiazole), poly(Al-2,5-dimercapto-1,3,4-thiadiazole), poly(Fe-2,5-dimercapto-1,3,4-thiadiazole), and the like.

Ionically conductive separator 24 transports protons between first electrode 16 and second electrode 22 as storage system is charged and discharged. Separator 24 includes an acid polymer gel coated on the surfaces of separator 24. The acid polymer gel may be formed from a silicontungstic acid (SiWA). In another embodiment, the SiWA is dispersed in polyDMcT, and applied to first and second nanotube electrodes 16 and 22. Because only protons are transported through separator 24, high rates of transport are facilitated and provide for low equivalent series resistance (ESR) high power density devices. The energy of storage system 10 may be calculated from the equation C=½ (Cdl+Credox)V², thus the energy is based on the surface area of the CNT and the molecular density of the DMcT. Power density is proportional to V²/4ESR thus as ESR decreases, power density increases.

The disulfide, for example, 2,5-dimercapto-1,3,4-thiadiazole (DMcT), may be electropolymerized to polyDMcT. The DMcT polymerization reaction is reversible as shown below.

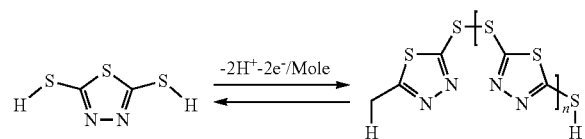

The DMcT is polymerized to polyDMcT during a charging cycle and reverts back to DMcT during a discharge cycle of storage system 10. For example, at the anode electrode DMcT→polyDMcT, and at the cathode electrode, polyDMcT→DMcT.

First current collector 12 and a second current collector 14 may be formed from any conductive material. Suitable conductive materials may include, but are not limited to, metals, carbon, graphite, and composite materials, for example, polymers containing carbon fibers or particles, graphite, and metal fibers or particles.

Figure 2:
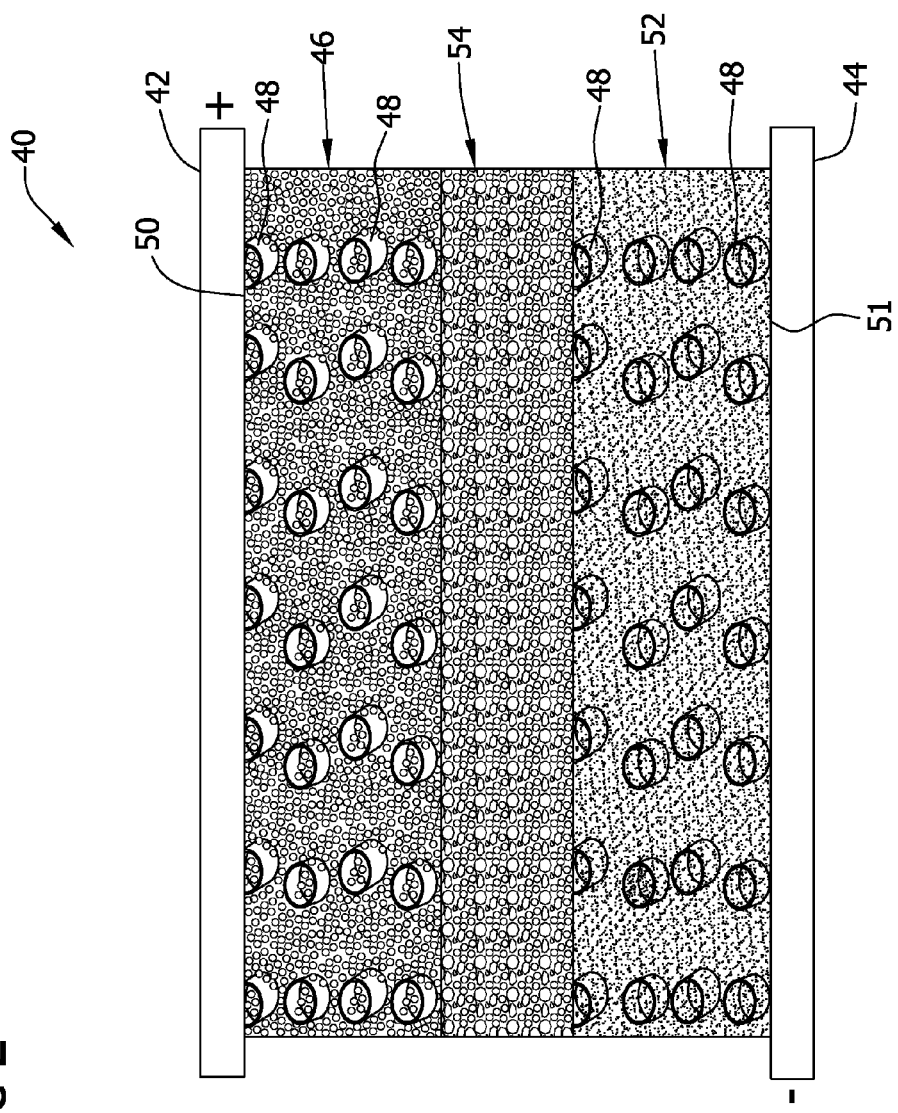
FIG. 2 is a schematic illustration of another embodiment of the redox polymer energy storage system.

In another embodiment, as best shown in FIG. 2, a redox polymer energy storage system 40 has a sandwich configuration of a plurality of layers as similar to energy storage system 10 described above. The layers include a first current collector 42 and a second current collector 44. A first electrode 46 formed from carbon nanotubes 48 (CNT) applied to an inner surface 50 of first current collector 42, and a second electrode 52 formed from carbon nanotubes 48 applied to an inner surface 51 of second current collector 44. An ionically conductive separator 54 is positioned between first electrode 46 and second electrode 52. First electrode 46 includes a polydisulfide deposited onto the surface of the carbon nanotubes 48. Second electrode 52 does not include a polydisulfide nor a disulfide. Separator 54 includes an acid polymer gel coated on the surfaces of separator 54. The acid polymer gel may be formed from a silicontungstic acid (SiWA).

The DMcT is polymerized to polyDMcT during a charging cycle and reverts back to DMcT during a discharge cycle of storage system 40. For example, at the anode electrode DMcT→polyDMcT, and at the cathode electrode, H⁺→H⁺ CNT⁻.

Figure 3:
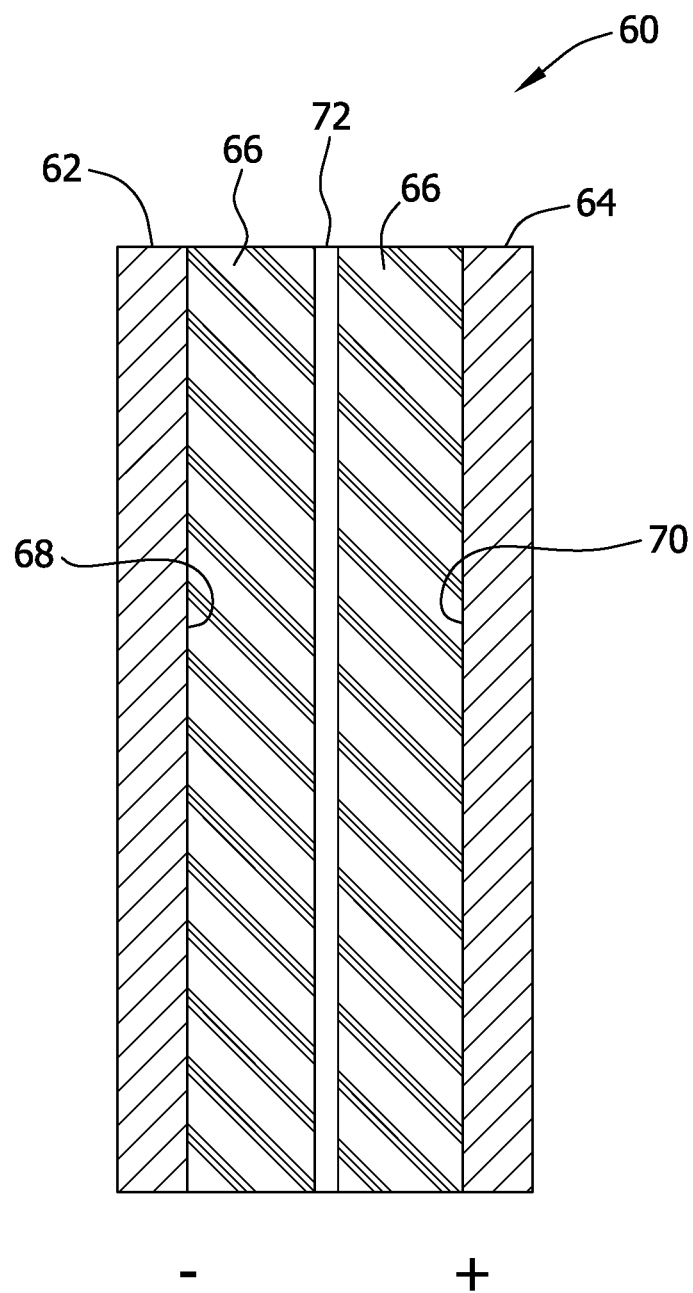
FIG. 3 is a schematic illustration of a super-capacitor of a first configuration.

Sample tests were performed to show the ability of super-capacitors to store energy. Three different super-capacitor configurations were tested. Type 1 configuration 60, shown in FIG. 3, included two carbon composite electrodes 62 and 64 having a coating 66 of a blend of polyDMcT and SiWA applied to inner surfaces 68 and 70 of electrodes 62 and 64 respectively. An ionically conductive separator 72 was positioned between electrodes 62 and 64. Separator 72 was a piece of Whatman 1 qualitative filter paper soaked in SiWA and air dried for about 20 minutes. The Type 1 super-capacitor was assembled by stacking electrodes 62 and 64 as shown in FIG. 3 with separator 72 between the electrodes.

Figure 4:
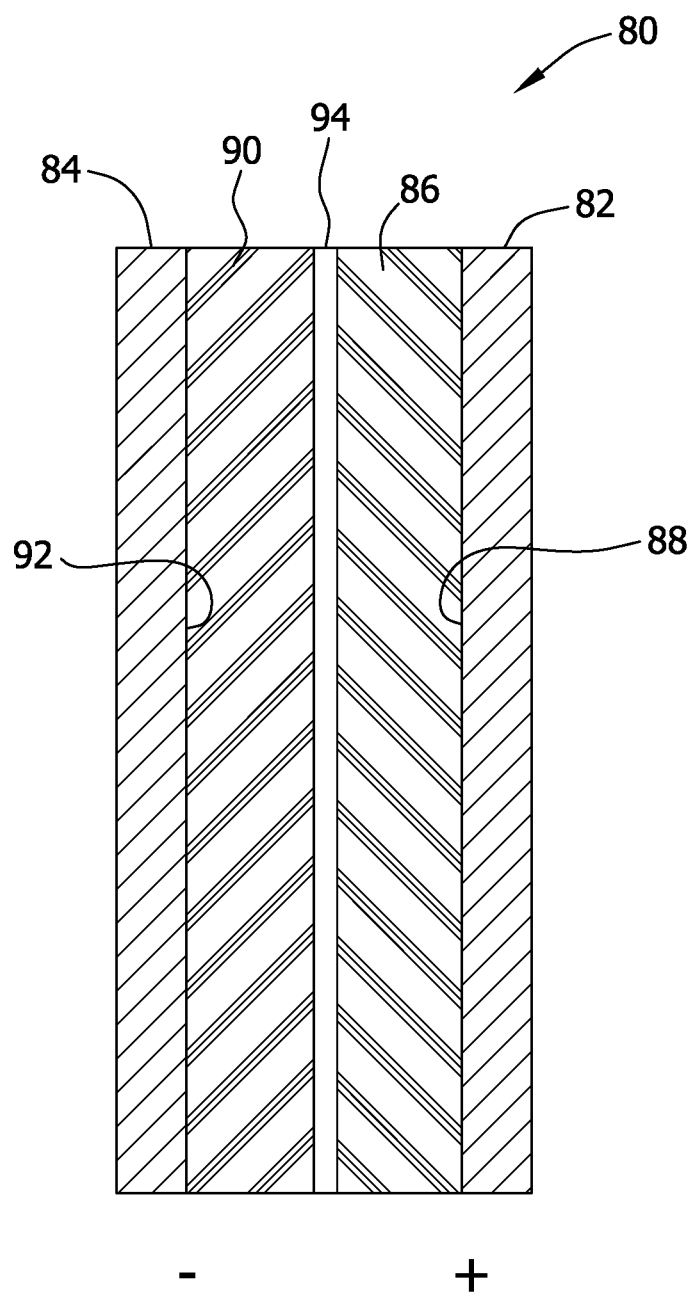
FIG. 4 is a schematic illustration of a super-capacitor of a second configuration.

Type 2 configuration 80, shown in FIG. 4, included two carbon composite electrodes 82 and 84. A coating 86 of a blend of polyDMcT and SiWA was applied to an inner surface 88 of electrode 82. A coating 90 of SiWA was applied to an inner surface 92 of electrode 84. An ionically conductive separator 94 was positioned between electrodes 82 and 44. Separator 94 was a piece of Whatman 1 qualitative filter paper soaked in SiWA and air dried for about 20 minutes. The Type 2 super-capacitor was assembled by stacking electrodes 82 and 84 as shown in FIG. 4 with separator 94 between the electrodes.

Figure 5:
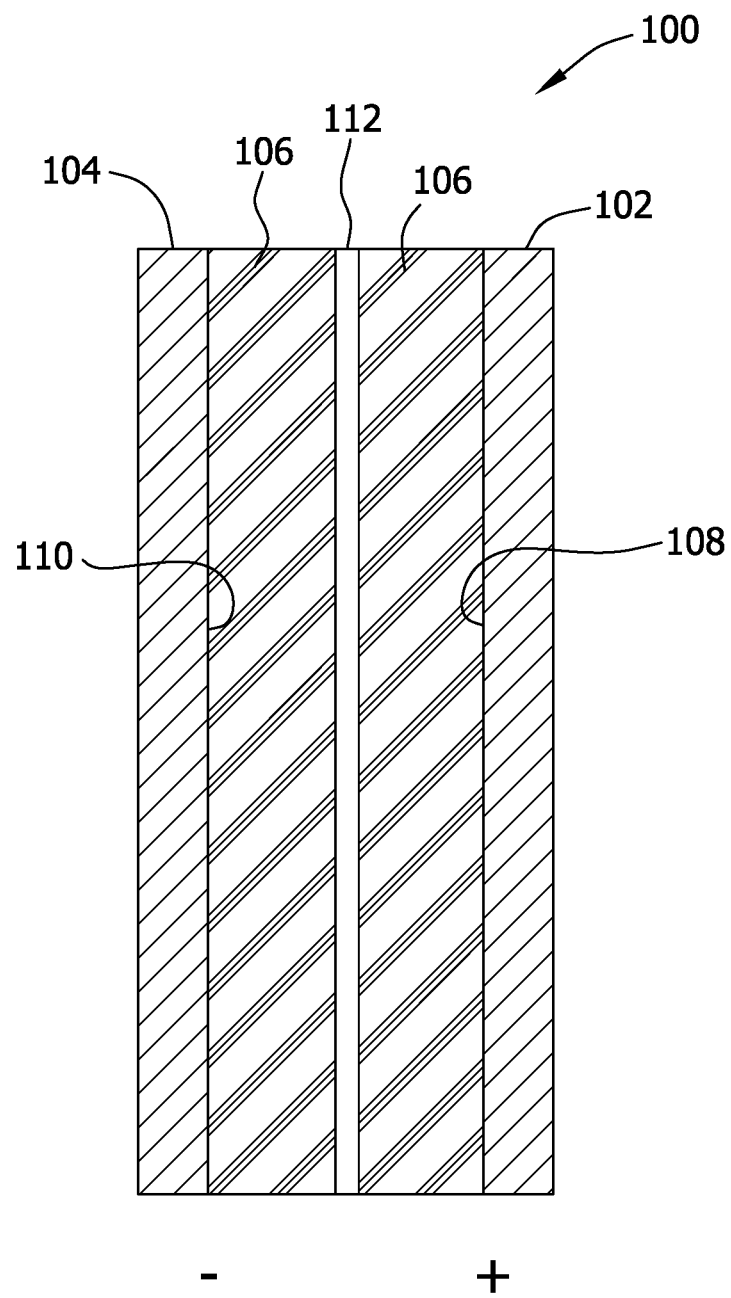
FIG. 5 is a schematic illustration of a super-capacitor of a third configuration.

Type 3 configuration 100, shown in FIG. 5, included two carbon composite electrodes 102 and 104 having a coating 106 of SiWA applied to inner surfaces 108 and 110 of electrodes 102 and 104 respectively. An ionically conductive separator 112 was positioned between electrodes 102 and 104. Separator 112 was a piece of Whatman 1 qualitative filter paper soaked in SiWA and air dried for about 20 minutes. The Type 3 super-capacitor was assembled by stacking electrodes 102 and 104 as shown in FIG. 5 with separator 112 between the electrodes.

Figure 6:
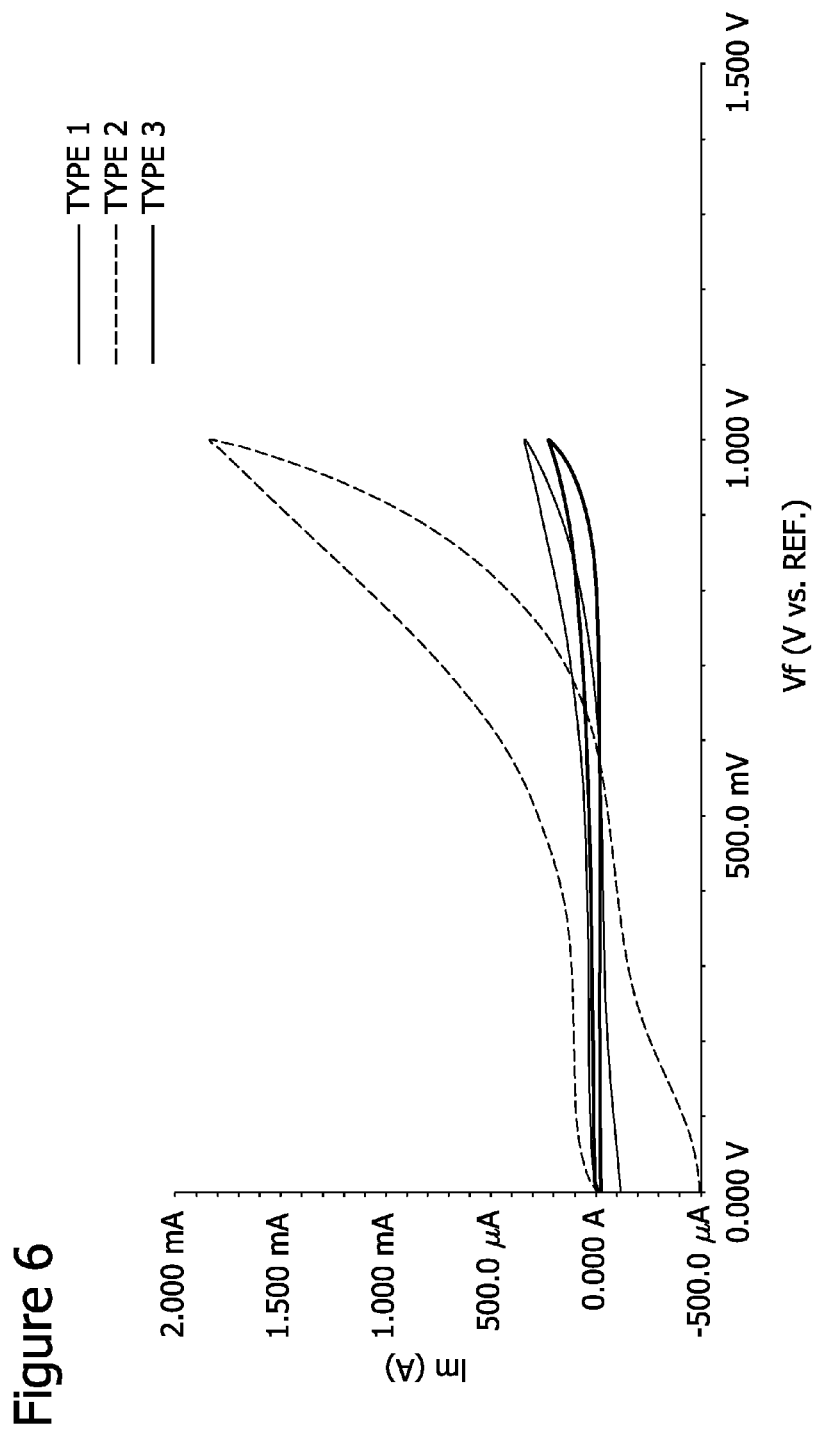
FIG. 6 is a graph of cyclic voltammetry of the super-capacitors shown in FIGS. 3-5.
Figure 7:
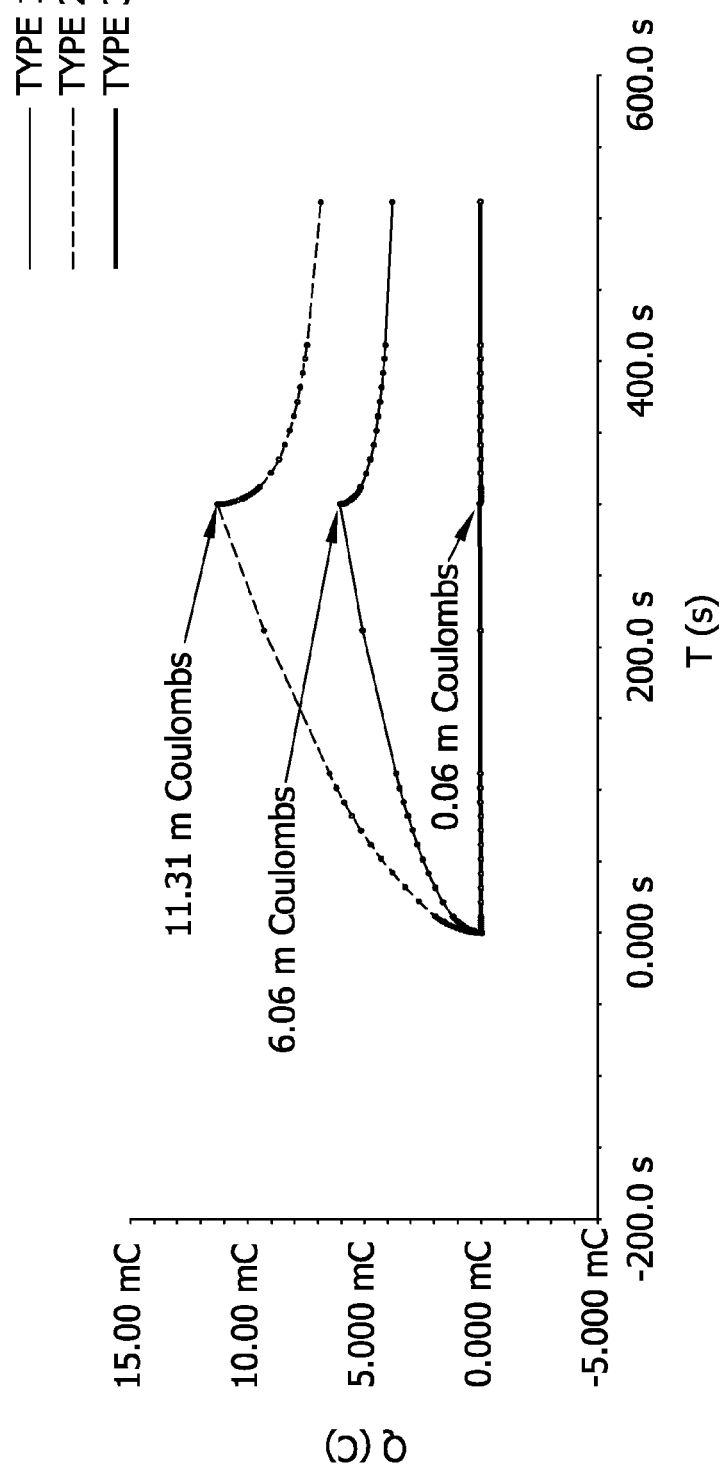
FIG. 7 is a graph of chronocoulometry of the super-capacitors shown in FIGS. 3-5.

Cyclic voltammetry was measured for Types 1-3. A graph shows the cyclic voltammetry in FIG. 6. The graph is an X-Y graph of potential (volts) versus current (amps). Chronocoulometry at a charge of 0 to 1.0 volt for 300 seconds was also measured for Types 1-3. A graph shows the Chronocoulometry in FIG. 7. The graph is an X-Y graph of charge (coulombs) versus time (seconds). As shown in FIGS. 6 and 7, configuration Types 1 and 2 showed to be superior to configuration Type 3.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of making an energy storage system, said method comprising:
    applying a plurality of carbon nanotubes to a surface of a first current collector;
    applying a plurality of carbon nanotubes to a surface of a second current collector;
    coating the carbon nanotubes of at least one of the first current collector and the second current collector with a blend that includes polydisulfide and silicotungstic acid; and
    positioning an ionically conductive separator between the carbon nanotubes applied to the first current collector and the nanotubes applied to the second current collector to form the energy storage system having a sandwich configuration.

2. The method in accordance with claim 1 further comprising applying an acid polymer gel to the ionically conductive separator.

3. The method in accordance with claim 2 wherein the acid polymer gel comprises a silicotungstic acid.

4. The method in accordance with claim 1 wherein coating the carbon nanotubes comprises coating the carbon nanotubes of the first current collector and the second current collector with a polydisulfide.

5. The method in accordance with claim 1 wherein the polydisulfide comprises at least one of poly(2,5-dimercapto-1,3,4-thiadiazole), bis-2,5-dithio-1,3,4-thiadizole, poly(Zn-2,5-dimercapto-1,3,4-thiadiazole), poly(Cu-2,5-dimercapto-1,3,4-thiadiazole), poly(Al-2,5-dimercapto-1,3,4-thiadiazole), and poly(Fe-2,5-dimercapto-1,3,4-thiadiazole).

6. The method in accordance with claim 1 further comprising electropolymerizing a 2,5-dimercapto-1,3,4-thiadiazole monomer to form the polydisulfide.

7. The method in accordance with claim 1, wherein positioning an ionically conductive separator comprises selecting the ionically conductive separator that only needs to facilitate proton transport.

8. The method in accordance with claim 1, wherein coating the carbon nanotubes comprises coating the carbon nanotubes such that the blend is positioned between the ionically conductive separator and at least one of the first current collector or the second current collector.

* * * * *